(12) United States Patent
Burgess et al.

(10) Patent No.: US 8,396,909 B1
(45) Date of Patent: *Mar. 12, 2013

(54) ELECTRONIC FILE MANAGEMENT HIERARCHICAL STRUCTURE

(75) Inventors: Cleburne Robinson Burgess, Helotes, TX (US); Michael Patrick Burns, San Antonio, TX (US); Daniel Lee Newman, San Antonio, TX (US); Keith Michael Askin, San Antonio, TX (US); Ana Maria Garcia, San Antonio, TX (US); Theron Daniel Smelser, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 285 days.

This patent is subject to a terminal disclaimer.

(21) Appl. No.: 11/734,756

(22) Filed: Apr. 12, 2007

(51) Int. Cl.
*G06F 17/30* (2006.01)

(52) U.S. Cl. .............. 707/829; 707/804

(58) Field of Classification Search .............. 707/101, 707/829, 804, 999.1, 999.101, 999.102
See application file for complete search history.

(56) References Cited

U.S. PATENT DOCUMENTS

| | | | | |
|---|---|---|---|---|
| 5,644,736 A * | 7/1997 | Healy et al. | | 715/784 |
| 5,812,870 A | 9/1998 | Kikinis et al. | | 712/32 |
| 6,175,830 B1 * | 1/2001 | Maynard | | 707/5 |
| 6,237,011 B1 * | 5/2001 | Ferguson et al. | | 715/234 |
| 6,370,538 B1 * | 4/2002 | Lamping et al. | | 1/1 |
| 6,604,108 B1 * | 8/2003 | Nitahara | | 707/102 |
| 6,952,281 B1 | 10/2005 | Irons et al. | | |
| 7,131,069 B1 * | 10/2006 | Rush et al. | | 715/738 |
| 7,203,654 B2 * | 4/2007 | Menendez | | 705/4 |
| 7,370,273 B2 * | 5/2008 | Beyer et al. | | 715/210 |
| 7,406,427 B1 * | 7/2008 | Guyan et al. | | 705/4 |
| 7,433,885 B2 * | 10/2008 | Jones | | 1/1 |
| 7,446,892 B1 * | 11/2008 | Churchill et al. | | 358/1.15 |
| 7,448,001 B2 * | 11/2008 | Miyazaki et al. | | 715/853 |
| 7,770,123 B1 * | 8/2010 | Meyer et al. | | 715/760 |
| 8,060,394 B2 * | 11/2011 | Woodings et al. | | 705/7.13 |
| 2001/0011286 A1 * | 8/2001 | Inoue et al. | | 707/513 |
| 2002/0007287 A1 | 1/2002 | Straube et al. | | |
| 2002/0111936 A1 * | 8/2002 | Adams et al. | | 707/1 |
| 2003/0088441 A1 | 5/2003 | McNerney | | 705/3 |
| 2003/0149657 A1 * | 8/2003 | Reynolds et al. | | 705/38 |

(Continued)

OTHER PUBLICATIONS

Eder et al., "Self-maintained Folder Hierarchies as Document Repositories", International Conference on Digital Libraries: Research and Practice, 2000, pp. 1-8, accessed online at <http://www.epanagos.com/pubs/00_kyoto.pdf> on Oct. 27, 2009.*

(Continued)

*Primary Examiner* — Phuong Thao Cao

(74) *Attorney, Agent, or Firm* — Brooks, Cameron & Huebsch, PLLC

(57) ABSTRACT

Based on received data descriptive of an event, a hierarchical data structure is constructed comprising structural elements associated with components of an event. A file folder hierarchy corresponding to the hierarchical data structure is created. User interfaces facilitate user access to files and folders in the hierarchies. Certain documents may be designated as documents of record and access to those documents is limited to processes that will not modify the original electronic document, thereby preserving it. Facilities for creating working copies of documents of records and associating them within the hierarchies are provided. A scanning information sheet that may have an electronically readable data imprint containing information about a document to be scanned is described for facilitating the migration of paper documents into an electronic file management system.

15 Claims, 13 Drawing Sheets

U.S. PATENT DOCUMENTS

| | | | |
|---|---|---|---|
| 2003/0200118 A1 | 10/2003 | Lee et al. | |
| 2003/0214538 A1* | 11/2003 | Farrington et al. | 345/854 |
| 2003/0218641 A1* | 11/2003 | Longobardi | 345/853 |
| 2004/0078337 A1* | 4/2004 | King et al. | 705/51 |
| 2004/0103102 A1* | 5/2004 | Nelson | 707/100 |
| 2004/0186750 A1* | 9/2004 | Surbey et al. | 705/4 |
| 2004/0205622 A1 | 10/2004 | Jones et al. | |
| 2004/0236676 A1* | 11/2004 | Takezawa et al. | 705/38 |
| 2004/0267694 A1* | 12/2004 | Sakai et al. | 707/1 |
| 2005/0033773 A1* | 2/2005 | Roberge et al. | 707/104.1 |
| 2005/0050472 A1* | 3/2005 | Faseler et al. | 715/734 |
| 2005/0114356 A1* | 5/2005 | Bhatti | 707/100 |
| 2005/0203718 A1* | 9/2005 | Carek et al. | 703/1 |
| 2005/0203885 A1* | 9/2005 | Chenevich et al. | 707/3 |
| 2005/0210040 A1* | 9/2005 | Beres et al. | 707/100 |
| 2005/0223024 A1* | 10/2005 | Hyun et al. | 707/102 |
| 2005/0223331 A1 | 10/2005 | Wolff et al. | |
| 2005/0228683 A1 | 10/2005 | Saylor et al. | 705/1 |
| 2006/0005156 A1* | 1/2006 | Korpipaa et al. | 717/100 |
| 2006/0026499 A1* | 2/2006 | Weddle | 715/503 |
| 2006/0045386 A1* | 3/2006 | Fukuoka et al. | 382/305 |
| 2006/0080140 A1 | 4/2006 | Buttner et al. | |
| 2006/0080278 A1* | 4/2006 | Neiditsch et al. | 707/1 |
| 2006/0085374 A1* | 4/2006 | Mayes et al. | 707/1 |
| 2006/0101041 A1* | 5/2006 | Agarwal et al. | 707/100 |
| 2006/0173904 A1* | 8/2006 | Nakajima | 707/102 |
| 2006/0173934 A1* | 8/2006 | Echtenkamp | 707/204 |
| 2006/0195491 A1* | 8/2006 | Nieland et al. | 707/204 |
| 2006/0206511 A1* | 9/2006 | Picon et al. | 707/102 |
| 2006/0242164 A1* | 10/2006 | Evans et al. | 707/100 |
| 2007/0055550 A1 | 3/2007 | Courtney et al. | |
| 2007/0061393 A1 | 3/2007 | Moore | |
| 2007/0094296 A1 | 4/2007 | Peters, III | |
| 2007/0100669 A1* | 5/2007 | Wargin et al. | 705/4 |
| 2007/0106678 A1* | 5/2007 | Ahrens et al. | 707/100 |
| 2007/0106932 A1* | 5/2007 | Coar | 715/512 |
| 2007/0125844 A1 | 6/2007 | Libin et al. | |
| 2007/0177824 A1* | 8/2007 | Cattrone et al. | 382/306 |
| 2007/0198560 A1* | 8/2007 | Foygel et al. | 707/101 |
| 2007/0276704 A1* | 11/2007 | Naumann et al. | 705/4 |
| 2008/0059500 A1* | 3/2008 | Symens | 707/101 |
| 2008/0078836 A1* | 4/2008 | Tomita | 235/462.11 |
| 2008/0080777 A1* | 4/2008 | Tomita | 382/232 |
| 2008/0091690 A1 | 4/2008 | Ellersick et al. | |
| 2008/0148190 A1* | 6/2008 | Schaff | 715/853 |
| 2008/0155652 A1* | 6/2008 | DeBie | 726/2 |
| 2008/0162535 A1* | 7/2008 | Bak | 707/102 |
| 2008/0168024 A1* | 7/2008 | Petty | 707/1 |
| 2008/0243890 A1* | 10/2008 | Glatfelter et al. | 707/101 |

OTHER PUBLICATIONS

Dalzell, M., "Where Will Health Plans Find the Next Generation of Savings?" *Managed Care Magazine*, http://www.managedcaremag.com/archives/0109/0109.nextgen.html, 2001, downloaded Apr. 11, 2007, 10(9), 8 pages.

FileNet Corporation, "Balboa Life & Casualty: Improved customer service and saved over $500,000 per year by automating claims processing the right way to go with the flow," http://www.filenet.com/English/Success/Stories/Global-English/020110005, 2005, downloaded Apr. 11, 2007, 1-3.

Guidewire Software ©, "Guidewire Claim Center: P&C Insurance Claims," http://www.guidewire.com/elqNow/elqRedir.htm?ref=/files/pdf/Guidewire_ClaimCenterBrochure.pdf, 2007, downloaded Apr. 11, 2007, 5 pages.

SAP, "Enhanced Claims Management with SAP® Claims Management," http://download.sap.com/download.epd?context=E594FC1E39252ADD6178134C931F7326987D6350CAF817F64168B6CFB81D6507E2FAC47A83A69DA0F5DAE4EE79C10A36DD95CAB1B52FE195, 2006, downloaded Apr. 11, 2007, 4 pages.

Datascribe, Inc., "Services: Recorded Claim Statements," http://datascribe-inc.net/services_claim_statement.html, downloaded Jul. 12, 2007, 2 pages.

U.S. Appl. No. 11/734,721 Cleburne Robinson Burgess et al., filed Apr. 12, 2007.

U.S. Appl. No. 11/734,728 Cleburne Robinson Burgess et al., filed Apr. 12, 2007.

U.S. Appl. No. 11/734,737 Cleburne Robinson Burgess et al., filed Apr. 12, 2007.

U.S. Appl. No. 11/734,746 Cleburne Robinson Burgess et al., filed Apr. 12, 2007.

U.S. Appl. No. 11/734,764 Cleburne Robinson Burgess et al., filed Apr. 12, 2007.

U.S. Appl. No. 11/828,247 Olvin Brett Lewis et al., filed Jul. 25, 2007.

U.S. Appl. No. 11/828,255 Olvin Brett Lewis et al., filed Jul. 25, 2007.

U.S. Appl. No. 11/828,269 Olvin Brett Lewis et al., filed Jul. 25, 2007.

* cited by examiner

400

- Loss Details
- 401 — Documentation
- 402 — File Management
- 403 — Reserves & Payments
- 404 — Policy
- 405 — Westerville Police Dept - Police/Fire
- 406 — Leroy Anderson - Witness
- 407 — Jane Smith - Pedestrian
  - Dr. Willard Jenkins - Doctor
- 408 — IV 2004 Ford F150
  - 412 — Jamie Lauck - Driver
    - 417 — St. Luke's Lutheran - Hospital
    - 418 — Jones Smith - Attorney
  - 414 — Ricky Lauck - Owner
- 409 — CV 1999 Chevy Suburban
  - 413 — Tom Jones - Driver
  - 415 — Jane Jones - Passenger
  - 416 — State Farm - Insurance
- 410 — Stationary Object – White Picket fence in front Yard
  - Mary Smith - Owner
- 411 — Clmt Boat – 1999 Sapphire 35-Foot

FIGURE 4

File eDoc

Lauck, Ricky #0978 90 87 L/R #: 106 DOL: 02/10/2006 eDoc Details eDoc Date: 03/16/2006 eDoc Type: Estimate eDoc Description: Jeep
(40 characters maximum)

↻ Refresh   ✗ Cancel

File

- 📄 Loss Event Overview
- ⊞ Ricky Lauck - Member
- ⊞ Loss Details
- ⊞ Reserves and Payments
- ⊞ Westerville Police Department - Investigative Agency ( Add Folder )
- ⊞ Leroy Anderson - Witness
- ⊟ ⊕ Jane Smith - Pedestrian ( Add Folder )
- ⊟ IV - 2004 Ford F150 ( Add Folder )
  - ☑ Physical Damage & Photos
  - ☐ Salvage & Total Loss
  - ☐ Correspondence
- ⊞ ⊕ Jamie Lauck - Driver ( Add Folder )
- ⊞ ⊕ Ricky Lauck - Owner ( Add Folder )
- ⊟ CV - 1999 Chevy Suburban ( Add Folder )
  - ☐ Physical Damage & Photos
  - ☐ Salvage & Total Loss
  - ☐ Correspondence
- ⊞ ⊕ Tom Jones - Driver ( Add Folder )
- ⊞ ⊕ Jane Jones - Passenger ( Add Folder )
- ⊟ Stationary Object - White Picket Fence in Front Yard
  - ☐ Physical Damage & Photos
  - ☐ Salvage & Total Loss
- ⊞ Mary Smith - Owner ( Add Folder )
- ⊟ CLMT Boat - 1999 Sapphire 35-Foot Weekender Yacht ( Add Folder )

FIGURE 6

Lauck, Ricky # 0891 82 67 L/R #: 123 DOL: 08/10/2005
Rank: General          Gender: MALE
DOB (Age): 1/30/1973 (46)   Marital Status: MARRIED          Eligibility: OFFICER

700

701 →

Loss Summary
Add to Loss: -- SELECT --  [Add]

⊟ Loss Event Overview
  Ricky Lauck - Member
  Loss Details
  Documentation
  File Management
  Reserves & Payments
  Policy
  Westerville Police Dept - Police/Fire
  Leroy Anderson - Witness
⊞ ↻ Jane Smith - Pedestrian                    ← 704
⊞ ↻ IV 2004 Ford F150
     Ricky Lauck - Owner
  ⊞ ↻ Jamie Lauck - Driver
⊞ ↻ CV 1999 Chevy Suburban
     ↻ Tom Jones - Driver
  ⊞ ↻ Jane Jones - Passenger
⊟ Stationary Object – White Picket fence in front Yard
  Mary Smith - Owner 703 →  Details | Injury Summary | eDocs                          ↻ Refresh  ⊠ Exit  To Bottom

Jamie Lauck - Insured Vehicle Driver ▶          ← 702
  Additional Roles:
  Primary Mailing: 1200 Wisteria Lane           Send Letter
                   Westerville, Ohio 45609
  Temporary Mailing: 3400 Main Avenue           Send Letter
                     New York, NY 08976

Email Address
  Email: JamieL@aol.com

Phone
  Home: (215) 756-7890  Dial Number    Work: (215) 757-2817 Ext:123  Dial Number
  Cell: (215) 213-3927  Dial Number    Fax: (215) 347-3875            Send a fax
  Temporary:

Other Information
  Operator Status: Restricted ⓘ              Age Category:
  Date of Birth (Age): 1/21/1978 (27)         Gender: Female
              SSN: 678-98-0987                Marital Status: Married
  Driver License: 21820192, New York          Occupation: Nurse
         License none                         Member of Yes
    Restrictions:                             Household:
  Restraining Device Seat belt                Relationship to spouse

ELECTRONIC FILE MANAGEMENT HIERARCHICAL STRUCTURE

CROSS REFERENCE TO RELATED APPLICATIONS

This application is related by subject matter to the inventions disclosed in the following commonly assigned applications: U.S. patent application Ser. No. 11/734,721, filed Apr. 12, 2007, entitled "Electronic File Management Hierarchical Structure"; U.S. patent application Ser. No. 11/734,728, filed Apr. 12, 2007, entitled "Electronic File Management Hierarchical Structure"; U.S. patent application Ser. No. 11/734,737, filed Apr. 12, 2007, entitled "Electronic File Management Hierarchical Structure"; U.S. patent application Ser. No. 11/734,746, filed Apr. 12, 2007, entitled "Electronic File Management Hierarchical Structure"; and U.S. patent application Ser. No. 11/734,764, filed Apr. 12, 2007, entitled "Electronic File Management Hierarchical Structure."

BACKGROUND

Some events, such as insurance claims and litigation, have traditionally been tracked and managed using paper files. These files typically include various documents relating to the event, as well as notes and other paperwork that are associated with the event. In addition, the file may be organized in some manner to enable a user to track various components of the event. Although paper files are generally secure and capable of being stored over long periods of time, they have significant drawbacks.

For example, if an event is particularly complex, the paper file may become very large, or may need to be separated into several files. Such an arrangement increases the likelihood that a part of the file may become lost. In addition, a paper file cannot be easily shared by several users, especially if the users are not in the same location.

Another area in which paper files are lacking is the maintenance of event-related documents. Using an automobile insurance claim as an example of an event, a document may be a picture of an accident scene. If a user (e.g., an insurance representative) needs to take notes with respect to the picture, the user may simply write on the picture itself. If an unaltered version of the picture is subsequently needed, the photographer may need to be contacted, or the picture retaken. Alternatively, the user would have to store an unaltered copy of the document in the file, along with the altered version, which would increase the size of the file and again increase the likelihood that a part of the file would become lost or disorganized. A further shortcoming of paper-based files is the inability to easily maintain cross-references between documents and the parts of the file to which the files pertain. This shortcoming is particularly pronounced as the size of the file increases and portions of the file change, as it requires a great deal of effort to manually maintain the accuracy of the file.

Some efforts have been made to create electronic files, but conventional electronic file systems lack the ability to associate electronic documents with the event in a logical fashion. Rather, the documents typically are listed in an electronic folder that is assigned to the event. A user that needs to access a document would have to access the folder and then inspect the documents, normally by using the names given to each document, to ascertain their relevance to the event.

SUMMARY

In view of the above shortcomings and drawbacks, methods, computer readable media and systems are provided for managing an event. Based on received data descriptive of an event, a hierarchical data structure is constructed comprising structural elements associated with components of the event. A file folder hierarchy corresponding to the hierarchical data structure is created. User interfaces facilitate user access to files and folders in the hierarchies. Certain documents may be designated as documents of record and access to those documents is limited to processes that will not modify the original electronic document, thereby preserving it. Facilities for creating working copies of documents of records and associating them within the hierarchies are provided. A scanning information sheet is described for facilitating the migration of paper documents into an electronic file management system.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The foregoing Summary, as well as the following detailed description, is better understood when read in conjunction with the appended drawings. For the purpose of illustrating the claimed subject matter, there is shown in the drawings example constructions of various embodiments; however, the invention is not limited to the specific methods and instrumentalities disclosed. In the drawings:

FIG. 4 is a screenshot illustrating an example user interface according to one embodiment;

FIGS. 6-11 are screenshots illustrating example user interfaces according to various embodiments.

DETAILED DESCRIPTION

The subject matter of the described embodiments is described with specificity to meet statutory requirements. However, the description itself is not intended to limit the scope of this patent. Rather, the inventors have contemplated that the claimed subject matter might also be embodied in other ways, to include different steps or elements similar to the ones described in this document, in conjunction with other present or future technologies. Moreover, although the term "step" may be used herein to connote different aspects of methods employed, the term should not be interpreted as implying any particular order among or between various steps herein disclosed unless and except when the order of individual steps is explicitly described.

Figure 1A:
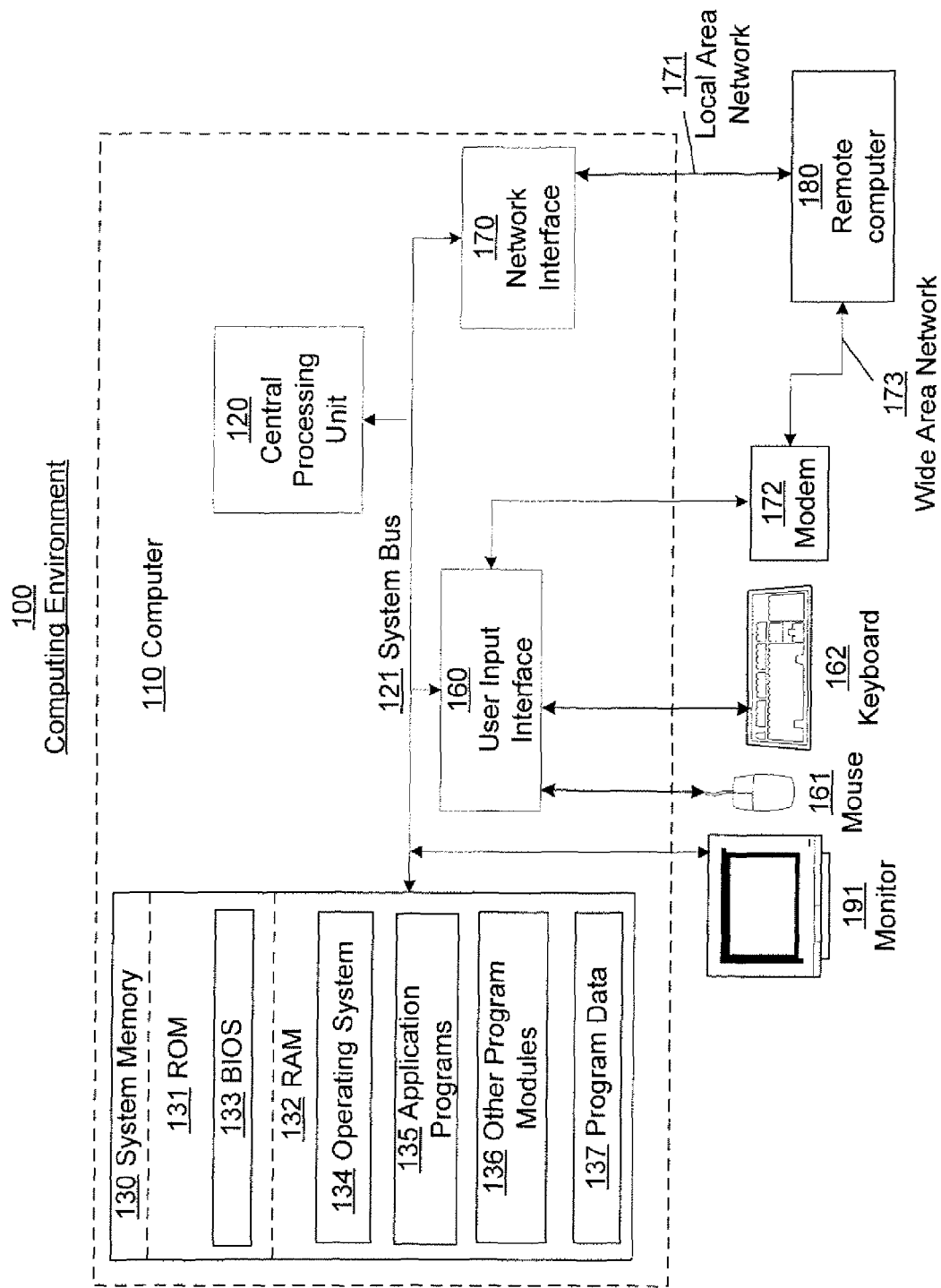
FIG. 1A illustrates an example computing environment in which aspects of one embodiment may be implemented.

FIG. 1A depicts an example computing environment 100 in which an example embodiment may be implemented. Computing environment 100 may include computer 110, monitor 191 and other input or output devices such as mouse 161, keyboard 162 and modem 172. Computers and computing environments such as computer 110 and computing environment 100 are known to those skilled in the art and thus are briefly described here.

An example system for implementing an embodiment includes a general purpose computing device in the form of computer 110. Components of computer 110 may include central processing unit 120, system memory 130 and system bus 121 that couples various system components including the system memory to processing unit 120.

System memory 130 may include computer storage media in the form of volatile and/or nonvolatile memory such as ROM 131 and RAM 132. A basic input/output system 133 (BIOS) containing the basic routines that help to transfer information between elements within computer 110, such as during start-up, may be stored in ROM 131. RAM 132 typically contains data and/or program modules that are immediately accessible to and/or presently being operated on by central processing unit 120. System memory 130 additionally may include, for example, operating system 134, application programs 135, other program modules 136 and program data 137.

Embodiments may be implemented in computing environment 100 in the form of any of a variety of computer readable media. Computer readable media can be any media that can be accessed by computer 110, including both volatile and nonvolatile, removable and non-removable media.

Computer 110 may operate in a networked environment using logical connections to one or more remote computers, such as remote computer 180. Remote computer 180 may be a personal computer, a server, a router, a network PC, a peer device or other common network node, and typically includes many or all of the elements described above relative to computer 110. The logical connections depicted in FIG. 1 include local area network (LAN) 171 and wide area network (WAN) 173, but may also include other networks. Such networking environments may be common in offices, enterprise-wide computer networks, intranets, and the Internet.

When used in a LAN networking environment, computer 110 may be connected to LAN 171 through network interface 170. When used in a WAN 173 networking environment, computer 110 may include modem 172 for establishing communications over WAN 173, such as the Internet. Modem 172 may be connected to system bus 121 via user input interface 160, or other appropriate mechanism.

Computer 110 or other client device can be deployed as part of a computer network. In this regard, various embodiments pertain to any computer system having any number of memory or storage units, and any number of applications and processes occurring across any number of storage units or volumes. An embodiment may apply to an environment with server computers and client computers deployed in a network environment, having remote or local storage. An embodiment may also apply to a standalone computing device, having programming language functionality, interpretation and execution capabilities.

An embodiment provides a mechanism for organizing and managing an event using an electronic organizational structure. Examples of events may include, for example, a litigation matter, an insurance claim and the like; however, an embodiment is not limited to these events. In addition, an embodiment may provide a mechanism for associating an electronic document with one or more components of the event. A component of an event may be anything that is related to the event. For example, if the event is an insurance claim, a component may be a party (e.g., the insured entity or a third party), property (e.g., insured vehicle or residence, third party vehicle or other property, etc.), other entities (e.g., doctors, lawyers, witnesses, governmental agencies, etc.) and the like. If the event is related to a litigation matter, a component may be, for example: a pleading or other court filing, a party to the suit, a witness, an expert, a consultant and the like. The choice of what constitutes a component of the event may depend on, for example, the specifics of the event itself, the manner in which the event is to be organized, etc. For purposes of explanation and clarity, the discussion herein largely focuses on an insurance claim event.

An event may have any number documents that are associated with it. A document may be, for example, a doctor's report, a bill, a pleading or other legal document, reference material, an insurance policy, a picture, an audio recording, a video recording, a witness statement, an expert or other consultant report, and the like. It will be appreciated that the preceding list of possible documents is for illustration purposes only, and is not meant to be exhaustive or limiting. Rather, it will be appreciated that a document may be any type of information that is relevant to an event in some way. Documents may be created in electronic form, or may be converted into electronic form, as will be discussed below.

Figure 1B:
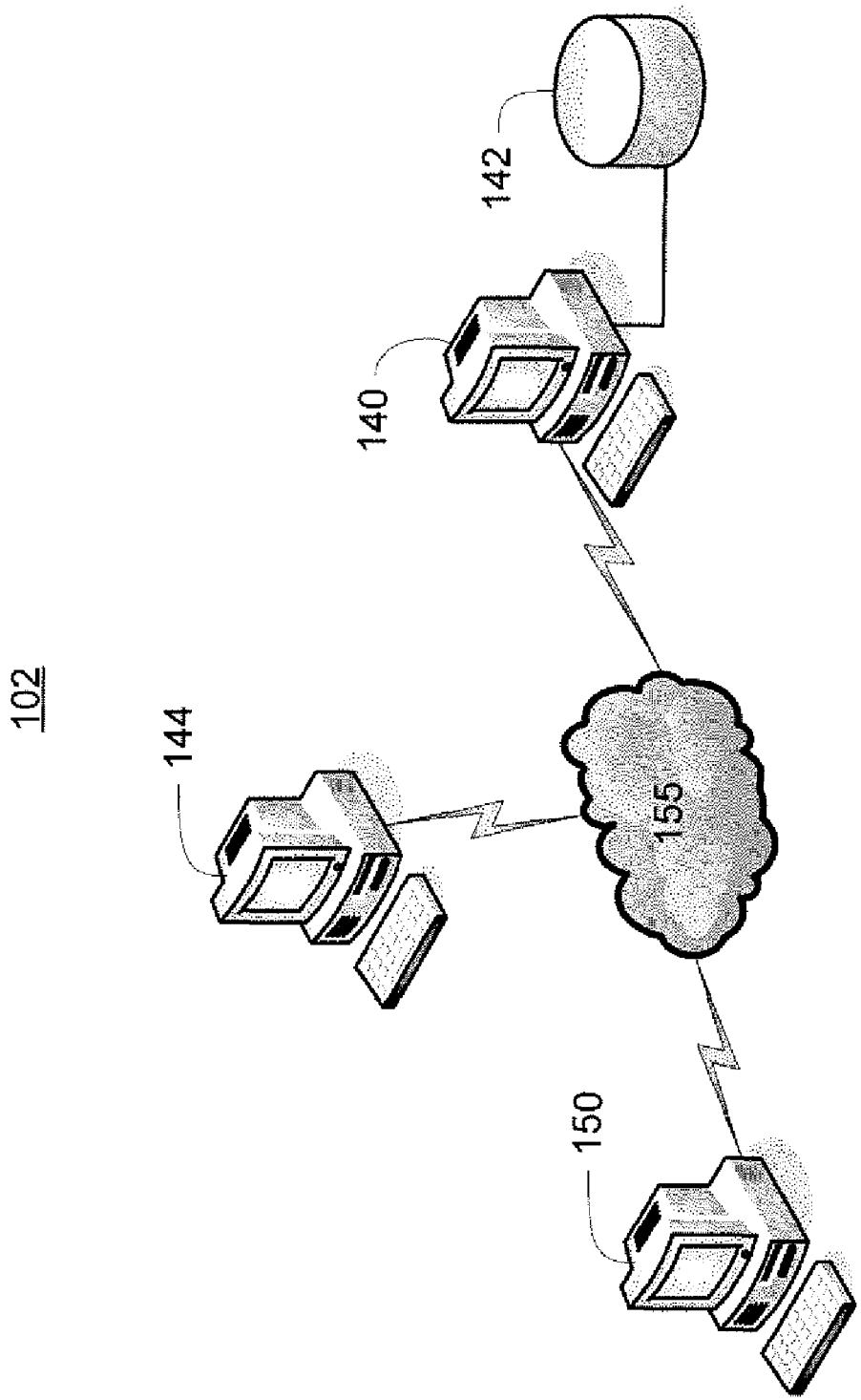
FIG. 1B illustrates an example computer network in which aspects of one embodiment may be implemented.

Referring now to FIG. 1B, in one embodiment, system 102 for managing an event is illustrated. System 102 may include computer network 155 such as, for example, a Transport Control Protocol/Internet Protocol (TCP/IP) network (e.g., the Internet, an intranet, etc.). Party 144 to the event may be operatively coupled to network 155. Likewise, one or more third parties 150 to the event may also be operatively coupled to network 155 in order to allow communication between party 144 and third party 150, and event manager 140. In an embodiment in which the event is an insurance claim, party 144 may be, for example, the insured party. In an embodiment in which the event is litigation, party 144 may be, for example, a party to the suit. Third party 150 may be, for example, a consultant, an expert, a witness, etc. It should be appreciated that parties 144 and 150 are represented in FIG. 1B by a computing device that may be associated with such entities. Such a computing device may be configured as described above in connection with FIG. 1A, for example. However, such entities may be present with respect to the event, but may lack a corresponding computing device. Thus, in an embodiment, any of the parties 144 and 150 need not be operatively connected to network 155, but may conduct business related to the event via other (e.g., non-electronic) means.

Event manager 140 may be any entity, person or the like which may organize, track, monitor, etc., the event. For example, if the event is an insurance claim, event manager 140 may be a service representative of an insurance company. If the event is litigation, event manager 140 may be a litigant, a court clerk, or the like. Operatively coupled to event manager 140 may be repository 142. Repository 142 may store any type of electronic document that is related to the event. An electronic document may be any of the documents discussed above, whether originally created and stored in repository 142, or whether converted (e.g., scanned, etc.) into electronic form and then stored in repository 142, or the like. In addition, although repository 142 is shown in FIG. 1B as being directly operatively coupled to event manager 140, repository 142 may be operatively coupled to event manager 140 by way of, for example, network 155 or the like.

Each of parties 144 and 150, as well as event manager 140, may include a respective network interface for communicating with network 155 (e.g., outputting information to and receiving information from network 155), such as by transferring information (e.g., instructions, data, signals) between such parties 144 and 150, and network 155. Accordingly, through network 155, parties 144 and 150 may communicate with event manager 140. For clarity, FIG. 1B depicts only one party 144, one third party 150 and one event manager 140. However, system 100 may include any number of such entities.

Figure 2A:
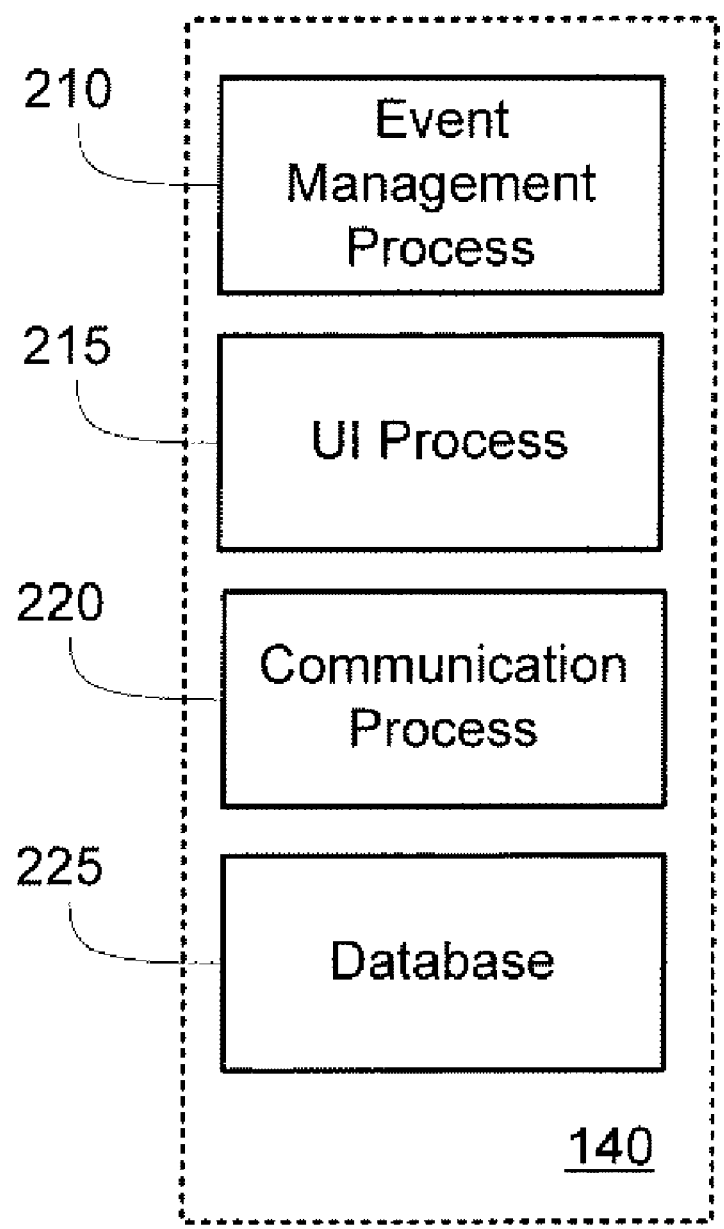
FIG. 2A illustrates an example electronic document notification according to one embodiment.

Referring now to FIG. 2A, event manager 140 is illustrated in more detail. Event management process 210 which may be, for example, stored on a computer-readable medium known in the art, may be included in event manager 140 and is operatively coupled to network 155, and to database 225. As will be discussed below, event management process 210 may be used to create, modify or delete information relating to an event, where the information may contain electronic documents and other data. User interface process 215, which may be, for example, stored on a computer-readable medium known in the art, may be included in event manager 140 and may be operatively coupled to network 155 and to database 140b. User interface process 215 may be adapted to display information on a display device. Communication process 220, which may be, for example, stored on a computer-readable medium known in the art, may be included in event manager 140 and may be operatively coupled to network 155 and to database 140b. Communication process 220 may enable communication with other devices or components made available by way of network 155, for example.

In one embodiment, processes 210-220 may be an integral part of a software application, while in other embodiments processes 210-220 may each be a separate application, API, plug-in, software component, etc. In an embodiment, database 225 may be located outside of event manager 140 and may still be operatively coupled to event manager 140. In an embodiment, database 225 may include one or more files that each relate to an event. In an embodiment, database 225 includes an organizational structure (e.g., a tree structure or the like) that describes the event.

Figure 2B:
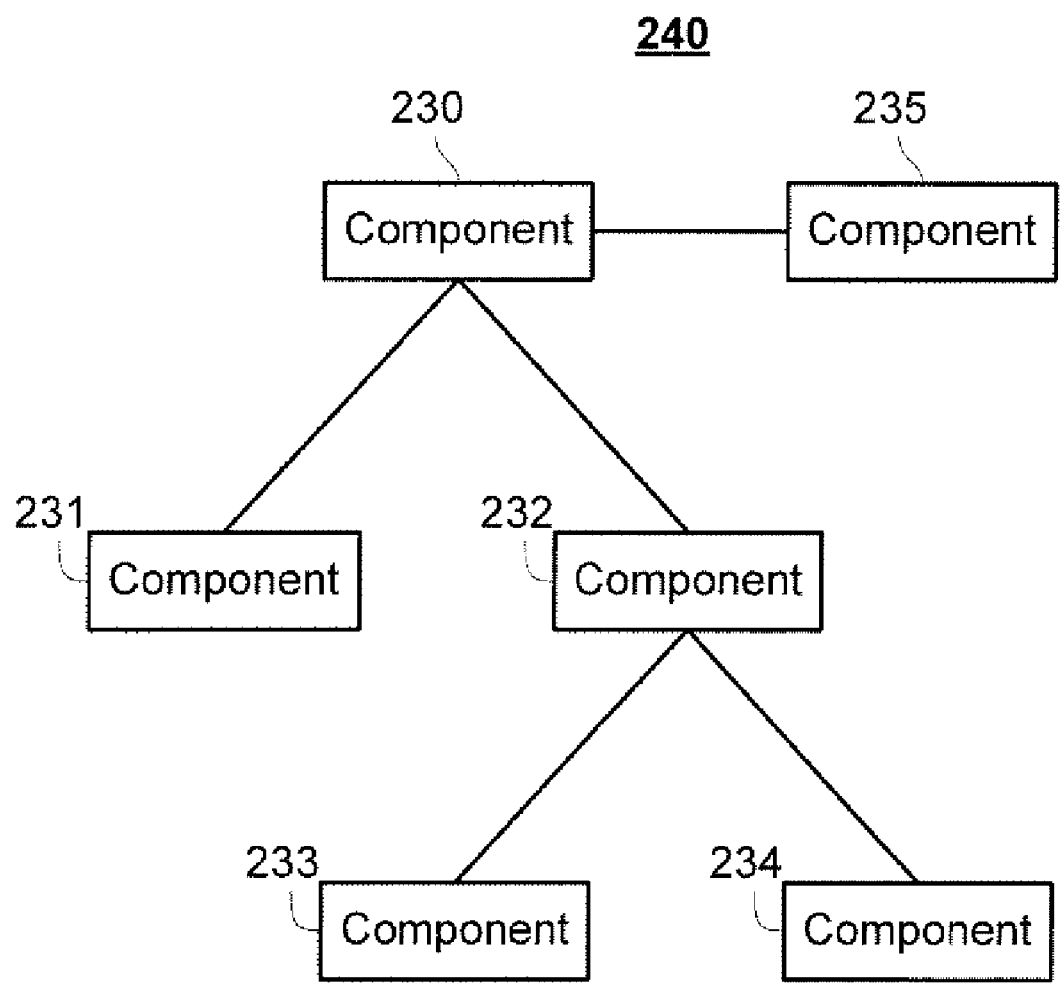
FIG. 2B illustrates an example organizational structure according to one embodiment.

Referring now to FIG. 2B, an example organizational structure 240 that may be used to represent an event is illustrated. For purposes of clarity, the discussion herein refers to such organizational structure 240 as a "tree structure," however, it will be appreciated that any type of organizational structure 240 is consistent with an embodiment, and therefore embodiments are not limited to a tree structure. Instead, a tree structure is just one possible organizational structure 240 that may be used in connection with an embodiment.

In an embodiment, organizational structure 240 may be formed from, for example, database entries, data fields or the like, that represent components 230-235 of the event. In other words, organizational structure 240 may be any data construct in which a relationship between at least two entities within the construct is maintained. The relationship between components 230-235 is illustrated in FIG. 2B as the lines connecting each component 230-235. Such components 230-235 may be any type of data structure, such as, but not limited to, a file, a file folder, data field(s), database entry and the like.

A relationship between two or more components 230-235 may be maintained by using links, data properties, free-text, or by using predefined fields that may describe and associate the components. Automated processes may also be used. Component relationship may be as siblings (e.g., component 230 to component 235, component 231 to component 232 and component 233 to component 234), parent-child (e.g., component 230 to either of components 231-232, or component 232 to either of components 233-234), grandparent-grandchild (e.g., component 230 to either of components 233-234), or the like. However, these relationships are illustrative only, as any type of relationship between components 230-235 may be established.

Figure 3:
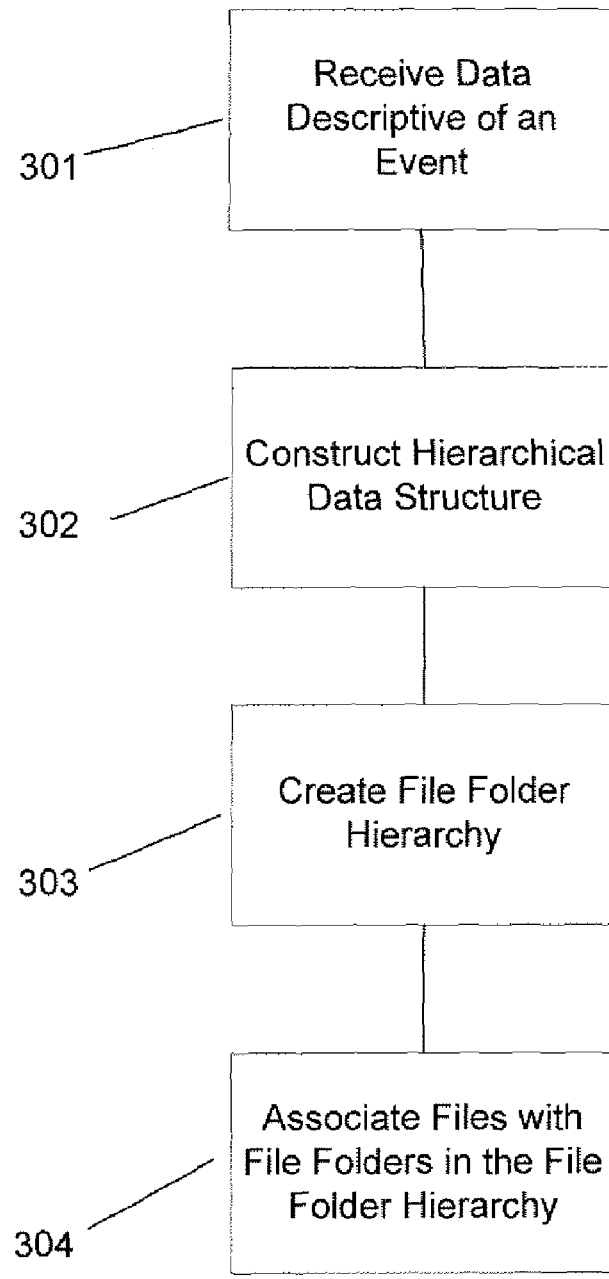
FIG. 3 is a flowchart illustrating an example method according to one embodiment.

FIG. 3 illustrates an example method 300 in which a hierarchical data structure and an electronic file folder hierarchy are created. At step 301, data descriptive of an event is received. The data may include data descriptive of components of the event. As an example, if the event is an insurance claim related to an automobile accident, the data may include data descriptive of a one or more insured parties, drivers, vehicles, governmental agencies, witnesses, and the like. The data may be entered into the event management process manually or automatically. The data may be received in any manner such as, for example, electronically, on paper documents, or via telephone.

Responsive to the received data, a hierarchical data structure is constructed at step 302. The data structure may comprise structural elements associated with components of the event. FIG. 4 illustrates an example user interface providing a graphical user interface depicting a navigation bar 400 corresponding to the hierarchical data structure. It will be appreciated that the manner in which information is presented in navigation bar 400 is for purposes of illustration and explanation only, and an embodiment is not limited to the particular arrangement illustrated in FIG. 4. In one embodiment, a description or data relating to various components of the event may be placed in appropriate locations of the tree structure. For example, an "insured party" data structure may in turn have one or more data fields (for free text entry, predefined field selection, etc.) into which data relating to the insured party may be placed as discussed above in connection with FIG. 2B. In the depicted example, the event is an insurance claim related to an automobile accident. The data structure may contain nodes corresponding to components common to all events. For example, the example data structure contains nodes corresponding to documentation 401, file management 402, reserves and payments 403, and a policy 404. The data structure may be populated with nodes corresponding to components of the event described by the received data, including, for example, a governmental agency 405, a witness 406, a pedestrian 407, two vehicles 408, 409, and other property 410, 411. For example, an automobile insurance claim may proceed in a substantially standard manner, and therefore a predefined tree structure, which may include some flexibility in terms of the specific data that may be entered, may be suitable for most or any automobile insurance claims.

A node of the data structure corresponding to a particular type of component may be automatically populated with a substructure defined for the type of component. For example, a node corresponding to a vehicle 408, 409 may be automatically populated with a child node corresponding to a driver 412, 413 respectively. A node corresponding to a hospital may be automatically populated with a child node corresponding to a doctor. Depending on the data received, a node may have additional substructures. For example, vehicle 408 has child node corresponding to an owner 414, and vehicle 409 had a child nodes corresponding to a passenger 415 and an insurance company 416. The node corresponding to a driver 412 has child nodes corresponding to a hospital 417 and an attorney 418. Not all possible branches need be created for every event. For example, if an automobile accident involves no injuries, there may be no need for folders related to medical matters.

Any number of components may be related to other components. For example, the insured party component may have an associated component relating to a medical examination, which in turn has an associated component relating to the retention of an attorney to collect the bill from the medical examination, and so forth. Thus, each component could have parent or child components that are each described in a data structure of some form.

At step 303 (FIG. 3) a file folder hierarchy is created. The file folder hierarchy corresponds to the hierarchical data structure. In some embodiments, there will be a one-to-one correspondence between file folders and nodes of the navigation bar 400. The file folder hierarchy may be created in parallel with or after the construction of the hierarchical data structure. Each file folder is associated with a node of the data structure and may contain subfolders corresponding to substructures of the node of the hierarchical data structure, files associated with the node, and other data.

At step 304, a file is associated with a folder of the file folder hierarchy. As noted above, a file may be any type of electronic data that is associated with a component of the event. Such electronic data may have been received by the event manager electronically (e.g., by way of parties 144 or 150 as discussed above in connection with FIG. 1B), or may have been received in paper or other analog form, as a disk or other computer readable media, etc. It will be appreciated that if the electronic data was received in a non-electronic form, some intermediate step(s) involving scanning or the like may take place prior to or in connection with step 304. In addition, a manual or automated step of storing or accessing electronic data that is received as a computer readable media may take place prior to or in connection with step 304.

Associating a document with a component may involve any number of steps. For example, in one embodiment the document may be located in data repository 142 as discussed above in connection with FIG. 1B. It will be appreciated that "associating" an electronic document with a component of an event may include any mechanism for enabling a user, such as an event manager, to directly access the electronic document. Thus, once associated, a user is able to access the document without, for example, navigating through a file structure in which the document may be stored. In one embodiment, the association may automatically provide a hyperlink that, when clicked, either displays the document or presents options for viewing, modifying or otherwise interacting with the document, for example. The hyperlink may be a link to the document as stored in, for example, data repository 142 as discussed above in connection with FIG. 1B.

Figure 5:
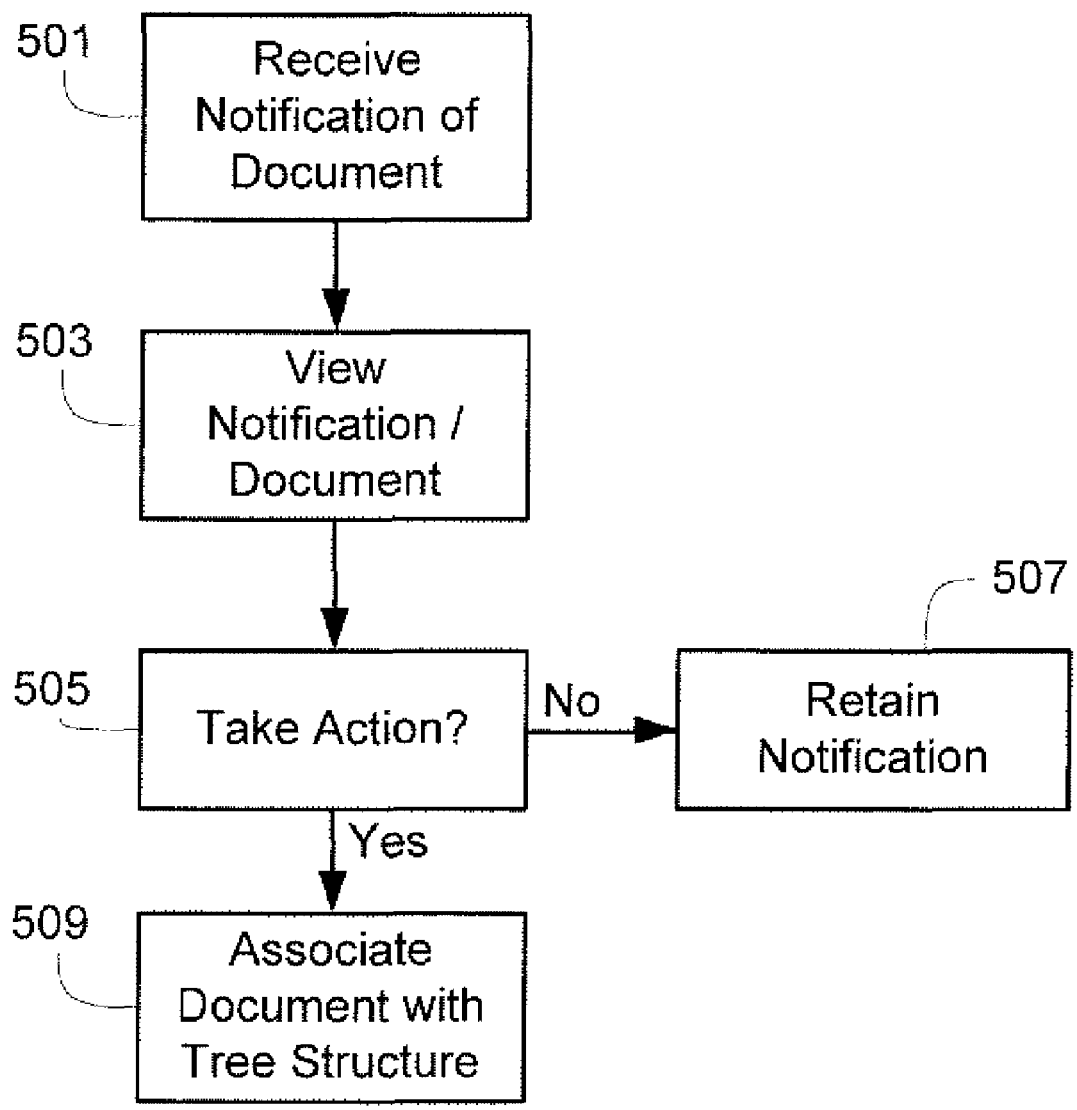
FIG. 5 is a flowchart illustrating an example method according to one embodiment.

FIG. 5 illustrates an example method 500 of associating an electronic document with a component of an event according to one embodiment. At step 501, a notification pertaining to the presence of a new event-related document is received by, for example, event manager 140 as discussed above in connection with FIG. 1B. In one embodiment, the notification is generated by event manager 140 upon the receipt of a new electronic document, and then presented to a user, which may also be event manager 140. An example of such a notification will be discussed below in connection with FIG. 6. The notification may contain an indication that an electronic document is available for association to one or more components of the event. It will be appreciated that prior to or in connection with step 501 some association of the electronic document to the event itself may be made. For example, when the electronic document is received, it may already be associated with the event using a matter identifier or the like. Alternatively, the event to which the document pertains may be ascertained and then the document may be associated with the event using a filename, identifier, etc.

At step 503, the notification may be viewed. As part of step 503, the document may be viewed, modified, or the like. At step 505, a determination is made as to whether any action should be taken with respect to the document. For example, an event manager or the like may need to associate the document with a component of the event. Alternatively, the event manager or the like may determine that no action is required. Such a situation may arise, for example, if a user that reviews the notification does not have the authority to associate the document with a component of the event. Alternatively, the user that reviews the notification may, because of an internal business procedure, or the like, not wish to allow another user to associate the document with a component of the event. For example, if the event is an insurance claim, more than one service representative may be able to work with the tree structure representing the claim, but only the primary representative servicing the claim may be responsible for associating the document with a component of the event. Thus, if the determination of step 503 is that no action need be taken, at step 507 the notification may be retained. Thus, the notification may be kept available for future viewing and a repeat of steps 503-505.

If the determination of step 503 is that an action should be taken, and then at step 509 the document may be associated with a component of the tree structure. As noted above, any manner of associating the document with the component such that the document is rendered directly accessible by a user such as an event manager is consistent with an embodiment. Such a manner of associating the document with a component may be enabled by any type of software or hardware mechanism, which may be conventional. Upon the completion of step 509, the notification may be retained or deleted.

FIG. 6 illustrates an example user interface 600 in which aspects of an embodiment of the data structure 601 may be displayed to a user such as, for example, an event manager, for purposes of associating a preselected electronic document with nodes of the data structure 601. It will be appreciated that the manner in which information is presented in user interface 600 is for purposes of illustration and explanation only, and an embodiment is not limited to the particular arrangement illustrated in FIG. 6.

User interface 600 provides a mechanism for associating a document with one or more components of the event. It will be appreciated that user interface 600 may be accessed by way of a "File eDoc" command. For example, a user may wish to update or add an association for a particular document. The window title, "File eDoc" 611, refers to an electronic document, "eDoc," that has been preselected by a user for association. A pull-down menu 602 allows a user to select a document type to be associated with the preselected document. By way of example, document types may comprise descriptors such as "Outgoing Correspondence", "Medical/Wage Authorization", "Claims Photos", "Vehicle Rental Bill", and the like. A text entry box 603 allows a user to enter a description of the preselected document.

Within user interface 600 is tree structure 601. It can be seen that in the example user interface 600 of FIG. 6, the event is an automobile insurance claim (i.e., a "loss event" as displayed in FIG. 6) that is organized into component 604, which corresponds to a first vehicle, and component 605, which corresponds to a second vehicle. It can be seen that components 604, 605 each have related components. For example, component 604 has components which correspond to physical damage and photos of the vehicle 606, salvage and total loss 607, and correspondence related to the vehicle 608. Additionally, vehicle component 604 has components corresponding to a driver of the vehicle 609 and the owner of the vehicle 610 which in turn may each have components relating to them which are not expanded in the view depicted, as indicated by the boxed "+" in front of the components 609, 610.

As can be seen in FIG. 6, the displays for certain components, such as those corresponding to physical damage and photos of the vehicle 606, salvage and total loss 607, and correspondence related to the vehicle 608, each have a checkbox associated with them. By selecting one or more checkboxes, a user may associate the preselected electronic document with one or more nodes of the tree structure 601 corresponding to the selected checkboxes and thus with one or more corresponding electronic file folders. This mechanism allows a user to add or update the associations between a file and various components of the data structure 601.

Similar user interfaces may be employed to provide a user with access to electronic documents for any purpose, such as, by way of examples and not limitation, sending a facsimile copy of the electronic document, creating notifications of "to do" items related to managing an electronic documents, reassociating an electronic document to another event, accessing a history of an electronic document, and the like.

FIG. 7 illustrates an example of a user interface in which nodes of the data structure may be made accessible. User interface 700 illustrates tree structure 701, which may be as discussed above in connection with FIG. 4. If desired, only branches of the tree structure 701 having documents and/or details associated with them may be depicted on the user interface 700. When an element of the tree structure 701 is selected, a window is populated with details 702 associated with the element of the tree structure. In the example, a node 704 corresponding to a driver has been selected and the interface window 702 is populated with information related to the driver component. Tab 703 ("Details") has been selected and details related to the selected node populate the interface window 702.

Figure 8:
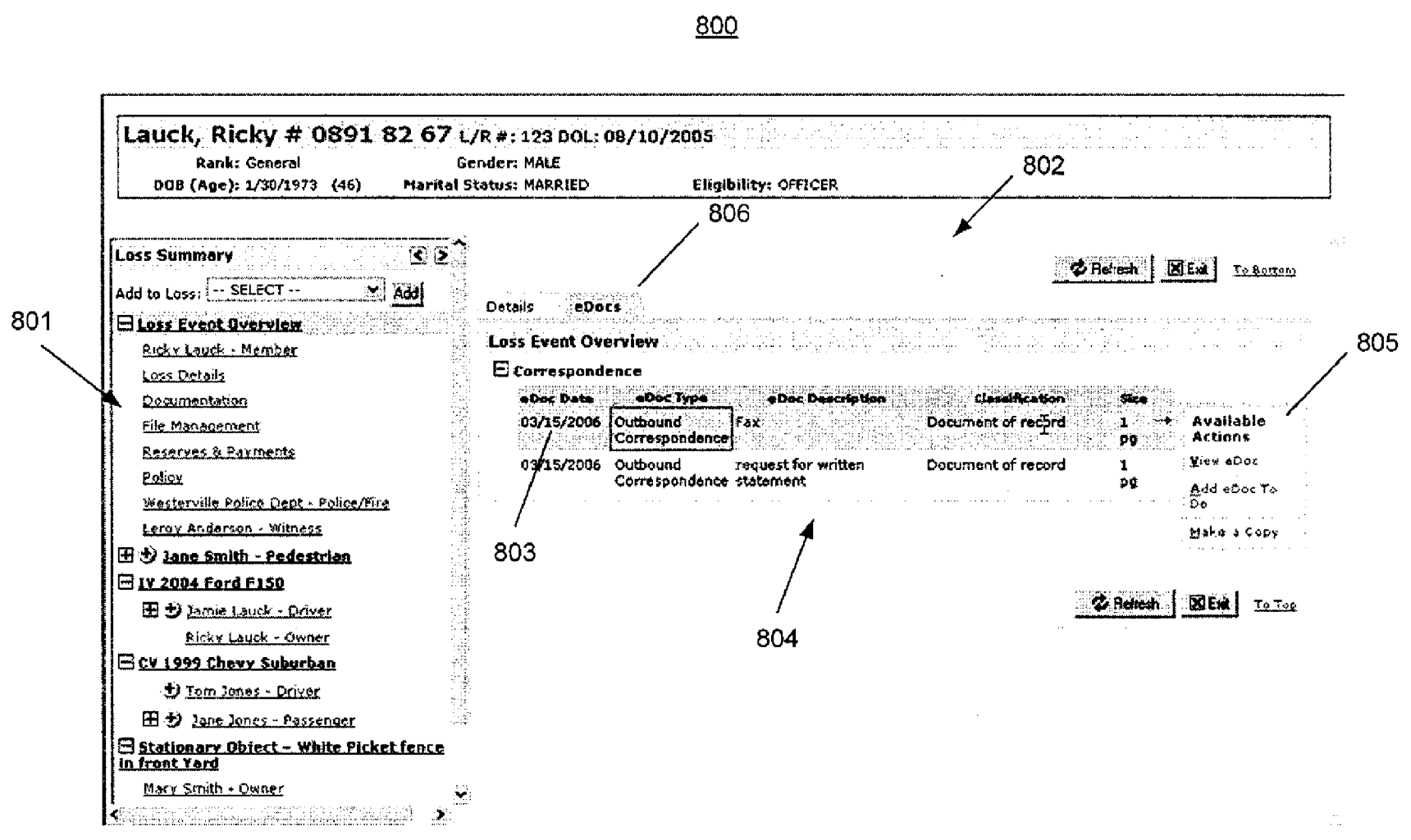

FIG. 8 illustrates an example of a user interface in which electronic documents may be made accessible. It will be appreciated that once a document has been associated with one or more components, a link or other mechanism may be used by an embodiment to provide direct access to the document. User interface 800 illustrates tree structure 801, which may be as discussed above in connection with FIGS. 4 and 7. In this figure, a node corresponding to a Loss Event Overview has been selected and the "eDocs" tab 806 of interface window 802 has been selected. Information related to electronic documents associated with the selected node, such as, by way of example, file date, file type, file description, file classification (as discussed below), and file size, is displayed in interface window 802. Selecting a document 803 from the list of displayed documents 804 brings up a selection box 805 of available actions for the selected document 803. It will be appreciated that an embodiment permits such a hyperlink to both locate a document and launch an appropriate viewer, which may be internal or external to a software application that is providing user interface 800.

Some embodiments provide for two classifications of electronic documents: "Document of Record" and "Working eDoc." When a document is first received and associated with a component of an event, as described above, the document is classified as a "Document of Record" ("DoR"). Classification as a DoR limits the kinds of operations that may be performed on the electronic document to those that preserve the integrity of the original document, prohibiting users from modifying or deleting the document. As examples, a user may be allowed to view or print the document, transmit a copy of the document, create a "To Do" item for the document, associate the document with another node, move the document to another event, view the history of the document, or request a rescan of an original physical document from which the electronic document was obtained. A user may also create a "Working eDoc" copy of the document, as described more fully below.

Figure 9:
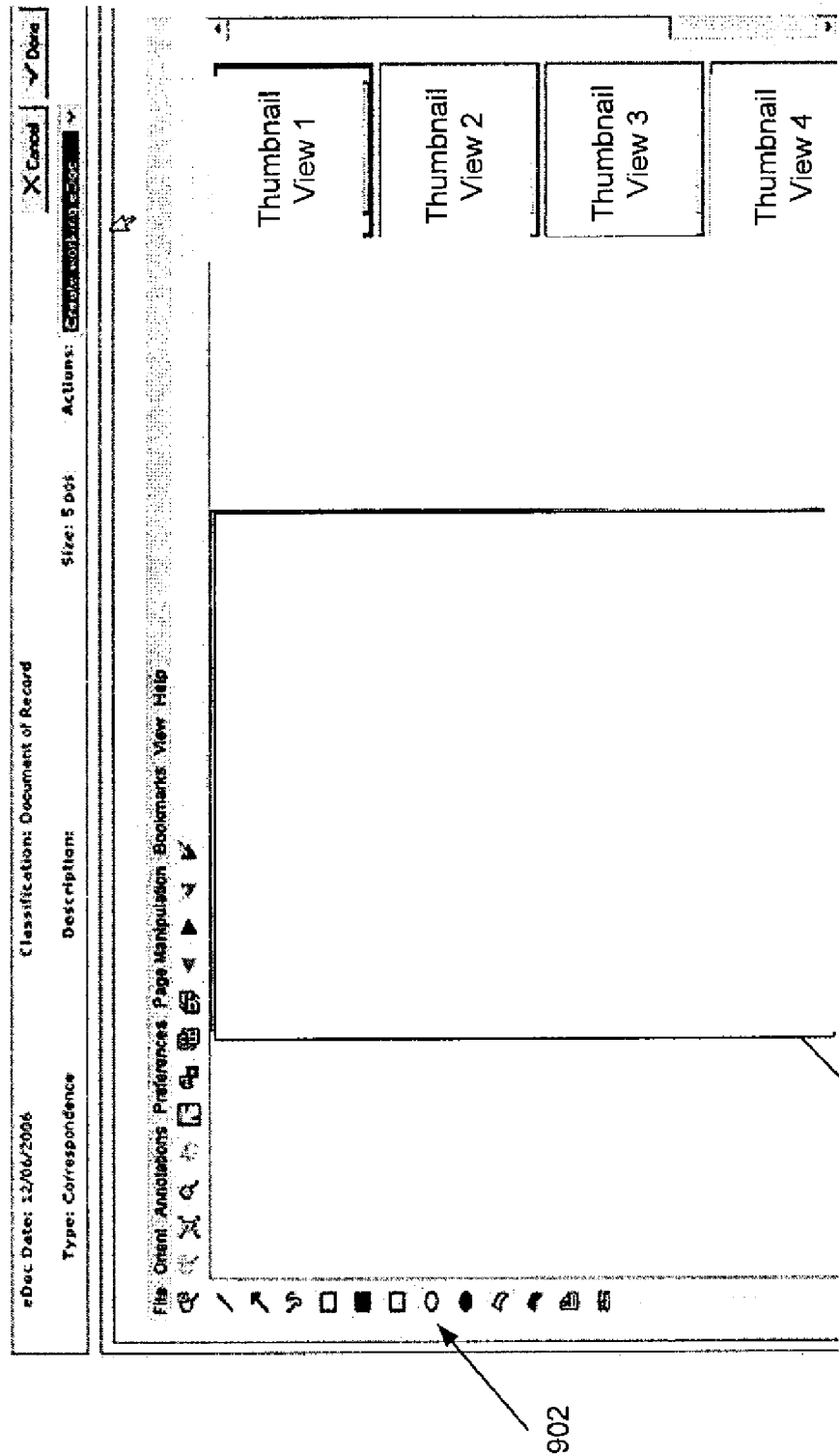

FIG. 9 illustrates an example user interface 900 which may be provided once a DoR has been selected for viewing. A document viewing window 901 may be provided, as an applet within a web browsing application, for example. Tools 902 may be provided to facilitate annotation of the DoR Annotations and bookmarks made to a DoR may be stored in a layer separate from the original electronic document so as to preserve the integrity of the original and may be made available for subsequent viewing with the DoR.

A user may create a working copy of a DoR, classified as a "Working eDoc." A Working eDoc may be created as a full copy of a DoR, may be created from selected pages of one or more DoRs, or may be created as an empty Working eDoc to which pages may be added later. A Working eDoc does not have the protections against modification that a DoR has. Portions of a Working eDoc may be deleted, redacted, or re-organized Annotations may be made directly in a Working eDoc. Certain actions may cause a Working eDoc may be reclassified as a new DoR. For example, if a Working eDoc is sent to a party, that Working eDoc may become a new DoR related to correspondence with the party.

Figure 10:
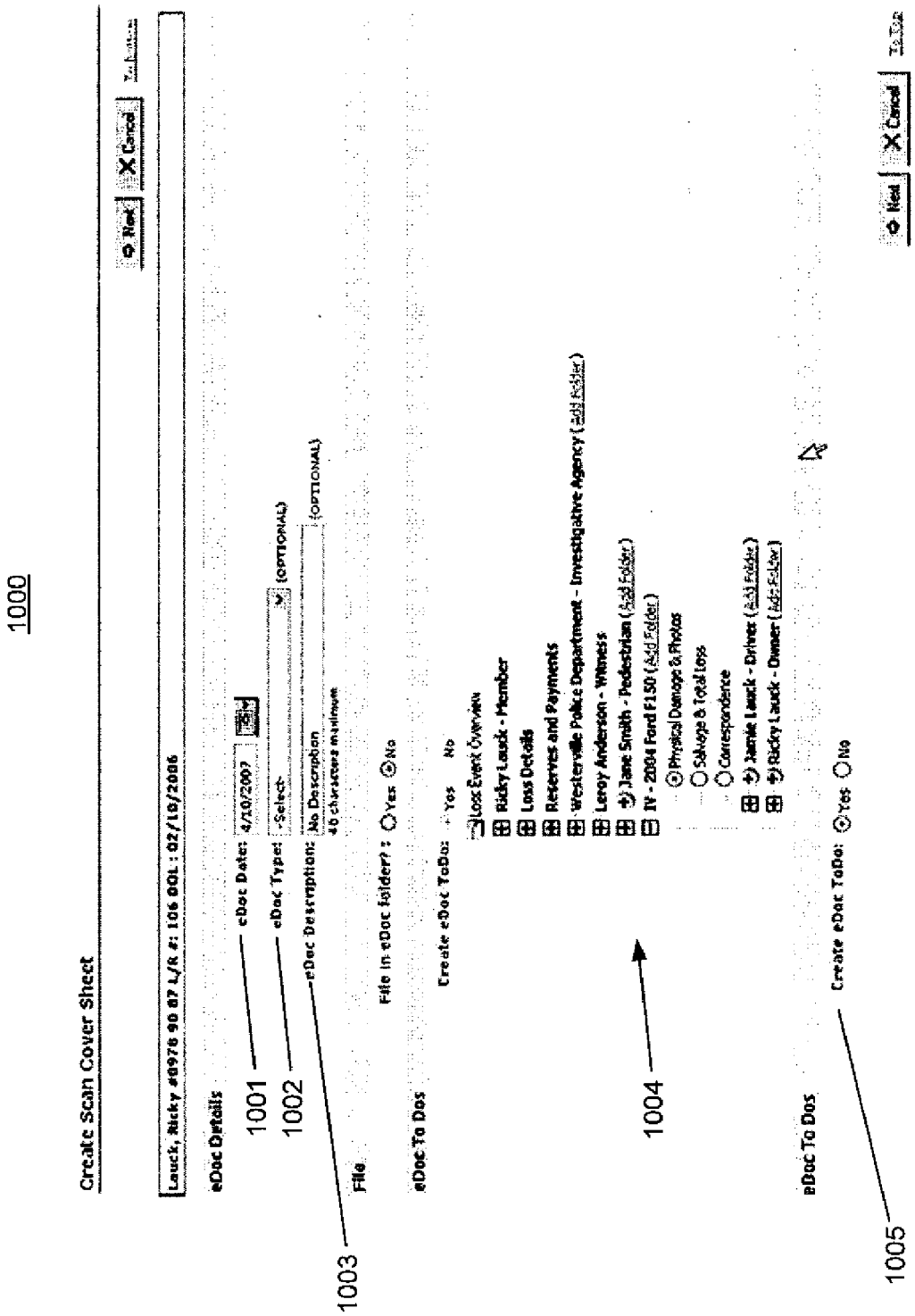

FIG. 10 illustrates an example user interface 1000 which may be provided to facilitate the migration from paper documents to electronic documents. When a paper document is identified for scanning to an electronic document, the interface 1000 may be activated. A user may provide information about an existing paper document through an interface similar to that used to file an electronic document as described above in relation to FIG. 6. Menus and/or text boxes may be provided to allow a user to specify an eDoc date 1001, document type 1002, and document description 1003. A graphical representation of the hierarchical data structure 1004 is provided and the user may select one or more components of the data structure with which to associate the electronic version of the document to be created. Additionally, the user may create a "To Do" item associated with the electronic document to be created 1005.

Figure 11:

In response to the user data entry and selections, a scan information sheet is created. FIG. 11 depicts an example of information that may be included on a scan information sheet 1100. For example, information relating to the event, such as the "Loss Details" 1101, the "eDoc details" 1102 for the electronic document to be created, the user requesting the scan 1103, the destination "File Location" 1104, and whether any "To Do" task requests 1105 are associated with the document, may be included. A bar code 1106, which may be a linear bar code, a 2-dimensional bar code, or the like, or other electronically readable data imprint is included and contains data correlated with the text data on the information sheet and may contain further data including with which node or nodes the newly created scanned electronic document is to be associated.

When the physical document is scanned, along with the scan information sheet, the information in the bar code is read. That information may be used to facilitate automatically filing the newly generated electronic document and associating the newly created eDoc and its details with the appropriate node or nodes of the hierarchical data structure as indicated by the data in the bar code. Additionally, "To Do" information that may be encoded in the bar code and associated with the new eDoc and will automatically be migrated to the electronic file management system.

Having a mechanism to facilitate the migration of paper documents into the electronic file management system may provide many benefits. Quickly moving pre-existing paper files into the electronic file management system can minimize any transition period wherein users might be working with both paper and electronic files and will allow users to more readily reap the benefits of working with a new electronic environment. Additionally, users will be able to put any training they receive regarding the electronic file management system into practice without delay, thereby mitigating loss of training due to disuse of the new electronic file management system.

The various techniques described herein may be implemented with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computer will generally include a processor, a storage medium readable by the processor (including volatile and non-volatile memory and/or storage elements), at least one input device and at least one output device. One or more programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

The methods and apparatus of the present invention may also be embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, a video recorder or the like, the machine becomes an apparatus for practicing the invention. When implemented on a general-purpose processor, the program code combines with the processor to provide a unique apparatus that operates to perform the indexing functionality of the present invention.

While the present invention has been described in connection with the preferred embodiments of the various figures, it is to be understood that other similar embodiments may be used or modifications and additions may be made to the described embodiment for performing the same function of the present invention without deviating therefrom. Therefore, the present invention should not be limited to any single embodiment, but rather should be construed in breadth and scope in accordance with the appended claims.

What is claimed is:

1. A computer system comprising:
    a hierarchical data structure, stored in an electronic device, including nodes correlated to one or more components of an insurance event, wherein the components of the insurance event include a defined relationship to each other using the insurance event, and wherein at least one node corresponding to a particular type of component is automatically populated with a substructure defined for the type of component based on facts associated with the insurance event;
    an electronic file folder hierarchy, stored in an electronic device, said electronic file folder hierarchy comprising electronic file folders each including a one-to-one correspondence to elements of a navigation structure; and
    a user interface, including a processor, configured to display a navigation structure corresponding to at least a portion of the hierarchical data structure and including a plurality of elements, wherein the user interface is further configured to:
        scan, using the processor, a paper document to an electronic document to be filed as an electronic file;
        create a scan information sheet having a bar code thereon, the bar code containing data pertaining to:
            the paper document; and
            text data included on the scan information sheet;
        detect, using the processor, a selection of the plurality of elements of the navigation structure; and
        associate, using the processor, the electronic file, using the bar code of the scan information sheet associated with the electronic file, with a plurality of electronic file folders corresponding to the selected plurality of elements of the navigation structure, wherein associating includes providing a hyperlink to display the electronic file.

2. The system as recited in claim 1, wherein the navigation structure is a tree structure.

3. The system as recited in claim 1, wherein the user interface is further configured to:
    detect, using the processor, a selection of an element of the navigation structure; and
    provide a user electronic access to an electronic file folder corresponding to the selected element of the navigation structure.

4. The system as recited in claim 1, wherein the user interface is further configured to:
    detect, using the processor, a selection of an element of the navigation structure; and
    associate, using the processor, an electronic file with an electronic file folder corresponding to the selected element of the navigation structure.

5. The system as recited in claim 1 wherein the user interface is configured to display only those elements of the navigation structure that correspond to electronic file folders that are associated with electronic files.

6. A computerized method comprising:
    constructing, using a processor, a hierarchical data structure responsive to data descriptive of components of an insurance event with defined relationships between the components of the insurance event, wherein the hierarchical data structure comprises nodes corresponding to components of the insurance event, and wherein at least one node corresponding to a particular type of component is automatically populated with a substructure defined for the type of component based on facts associated with the insurance event;
    providing, over an electronic connection, a user interface configured to display a navigation structure corresponding to at least a portion of the hierarchical data structure;
    automatically creating, using the processor, an electronic file folder hierarchy, said electronic file folder hierarchy comprising electronic file folders each including a one-to-one correspondence to elements of the navigation structure;
    scanning, using the processor, a paper document to an electronic document to be filed as an electronic file;
    creating a scan information sheet having a bar code thereon, the bar code containing data pertaining to:
        the paper document; and
        text data included on the scan information sheet;
    detecting, using the processor, a selection of a plurality of elements of the navigation structure; and associating, using the processor, an electronic file, using the bar code of the scan information sheet associated with the electronic file, with a plurality of electronic file folders corresponding to the selected plurality of elements of the navigation structure, wherein associating includes providing a hyperlink to display the electronic file.

7. The computerized method as recited in claim 6, wherein the navigation structure is a tree structure.

8. The computerized method as recited in claim 6, further comprising:
   detecting, using the processor, a selection of an element of the navigation structure; and
   providing, over an electronic connection, a user access to an electronic file folder corresponding to the selected element of the navigation structure.

9. The computerized method as recited in claim 6, further comprising:
   detecting, using the processor, a selection of an element of the navigation structure; and
   associating, using the processor, an electronic file with an electronic file folder corresponding to the selected element of the navigation structure.

10. The computerized method as recited in claim 6 wherein the user interface is configured to display only those elements of the navigation structure that correspond to electronic file folders that are associated with electronic files.

11. A non-transitory computer readable storage medium comprising computer executable instructions, which when implemented by a computer perform:
   constructing a hierarchical data structure responsive to data descriptive of components of an insurance event with defined relationships between the components of the insurance event, wherein the hierarchical data structure comprises nodes corresponding to components of the insurance event, and wherein at least one node corresponding to a particular type of component is automatically populated with a substructure defined for the type of component based on facts associated with the insurance event;
   providing a user interface configured to display a navigation structure corresponding to at least a portion of the hierarchical data structure;
   automatically creating an electronic file folder hierarchy, said electronic file folder hierarchy comprising electronic file folders each including a one-to-one correspondence to elements of the navigation structure;
   scanning a paper document to an electronic document to be filed as an electronic file;
   creating a scan information sheet having a bar code thereon, the bar code containing data pertaining to:
      the paper document; and
      text data included on the scan information sheet;
   detecting a selection of a plurality of elements of the navigation structure; and
   associating an electronic file, using the bar code of the scan information sheet associated with the electronic file, with a plurality of electronic file folders corresponding to the selected plurality of elements of the navigation structure, wherein associating includes providing a hyperlink to display the electronic file.

12. The non-transitory computer readable storage medium as recited in claim 11, wherein the navigation structure is a tree structure.

13. The non-transitory computer readable storage medium as recited in claim 11, further comprising computer executable instructions for:
   detecting a selection of an element of the navigation structure; and
   providing a user access to an electronic file folder corresponding to the selected element of the navigation structure.

14. The non-transitory computer readable storage medium as recited in claim 11, further comprising computer executable instructions for:
   detecting a selection of an element of the navigation structure; and
   associating an electronic file with an electronic file folder corresponding to the selected element of the navigation structure.

15. The non-transitory computer readable storage medium as recited in claim 11 wherein the user interface is configured to display only those elements of the navigation structure that correspond to electronic file folders that are associated with electronic files.

* * * * *